United States Patent
Slaughter et al.

(10) Patent No.: US 6,618,767 B1
(45) Date of Patent: Sep. 9, 2003

(54) MECHANISM BY WHICH DEVICES ON UNFORESEEN PLATFORM VARIANTS MAY BE SUPPORTED WITHOUT RE-RELEASE OF CORE PLATFORM KERNEL SOFTWARE

(75) Inventors: Gregory Slaughter, Palo Alto, CA (US); Donald Hudson, Jr., San Jose, CA (US); Thomas Saulpaugh, San Jose, CA (US); Yuh-Yen Yeh, San Jose, CA (US); Bernard Traversat, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/193,199

(22) Filed: Nov. 17, 1998

(51) Int. Cl.[7] .............................................. G06F 13/10

(52) U.S. Cl. ....................................... 709/321; 709/328

(58) Field of Search ................................ 709/310–328; 717/1

(56) References Cited

U.S. PATENT DOCUMENTS

| | | | |
|---|---|---|---|
| 4,173,783 A | 11/1979 | Couleur et al. | |
| 4,533,996 A | 8/1985 | Hartung et al. | |
| 5,265,252 A | * 11/1993 | Rawson et al. | 709/326 |
| 5,291,585 A | 3/1994 | Sato et al. | |
| 5,309,563 A | 5/1994 | Farrand et al. | |
| 5,335,320 A | 8/1994 | Iwata et al. | |
| 5,345,550 A | 9/1994 | Bloomfield | |
| 5,347,627 A | 9/1994 | Hoffmann et al. | |
| 5,384,911 A | 1/1995 | Bloomfield | |
| 5,404,494 A | 4/1995 | Garney | |
| 5,412,772 A | 5/1995 | Monson | |
| 5,414,806 A | 5/1995 | Richards | |
| 5,423,034 A | 6/1995 | Cohen-Levy et al. | |
| 5,430,836 A | 7/1995 | Wolf et al. | |
| 5,436,637 A | 7/1995 | Gayraud et al. | |
| 5,448,695 A | 9/1995 | Douglas et al. | |
| 5,461,399 A | 10/1995 | Cragun | |
| 5,461,710 A | 10/1995 | Bloomfield et al. | |
| 5,473,745 A | 12/1995 | Berry et al. | |
| 5,473,777 A | 12/1995 | Moeller et al. | |
| 5,491,784 A | 2/1996 | Douglas et al. | |
| 5,493,638 A | 2/1996 | Hooper et al. | |
| 5,509,116 A | 4/1996 | Hiraga et al. | |

(List continued on next page.)

FOREIGN PATENT DOCUMENTS

| | | |
|---|---|---|
| EP | 0737917 | 10/1996 |
| EP | 0 953 899 A2 | 11/1999 |
| WO | WO97/44739 | 11/1997 |

OTHER PUBLICATIONS

"JavaOS for Business Version 2.0—Device Driver Guide", Jun. 1998, Sun Microsystem and IBM Corporation.*

Guibas et al., "Compilation and Delayed Evaluation in APL," 1978, Fifth Annual ACM Symposium on Principles of Programming Languages, p. 1–8.

Ronald L. Johnston, "The Dynamic Incremental Compiler of APL/3000", Proceedings of the APL '79 Conference, published as APL Quote Quad, 9(4), p 82–87.

(List continued on next page.)

*Primary Examiner*—John Follansbee
*Assistant Examiner*—Diem K. Cao
(74) *Attorney, Agent, or Firm*—Beyer Weaver & Thomas, LLP (57) ABSTRACT

The present invention provides a means to support new and modified platforms without the need to modify the system software kernel. The invention uses an approach referred to as Platform Service Agents (PSAs). The PSA works with the bus manager of the system software for that platform variant and modifies the system resources as needed. The PSA isolates specifics of the platform, so that the bus manager need not be modified. Because the PSAs themselves are outside of the kernel, are downloadable, and easily created for platform variants, new platforms can be supported without modification or re-release of the system software kernel.

20 Claims, 5 Drawing Sheets

U.S. PATENT DOCUMENTS

| | | |
|---|---|---|
| 5,526,517 A | 6/1996 | Jones et al. |
| 5,544,288 A | 8/1996 | Morgan et al. |
| 5,546,519 A | 8/1996 | Berry |
| 5,548,702 A | 8/1996 | Li et al. |
| 5,550,968 A | 8/1996 | Miller et al. |
| 5,559,942 A | 9/1996 | Gough et al. |
| 5,564,003 A | 10/1996 | Bell et al. |
| 5,566,330 A | 10/1996 | Sheffield |
| 5,570,462 A | 10/1996 | McFarland |
| 5,572,643 A | 11/1996 | Judson |
| 5,694,603 A | 12/1997 | Reiffin |
| 5,694,604 A | 12/1997 | Reiffin |
| 5,701,476 A | 12/1997 | Fenger |
| 5,701,483 A | 12/1997 | Pun |
| 5,727,212 A * | 3/1998 | Dinallo .................. 709/321 |
| 5,752,032 A | 5/1998 | Keller et al. |
| 5,790,887 A | 8/1998 | Brech |
| 5,829,053 A | 10/1998 | Smith et al. |
| 5,860,079 A | 1/1999 | Smith et al. |
| 5,867,690 A | 2/1999 | Lee et al. |
| 5,898,896 A | 4/1999 | Kaiser et al. |
| 5,909,576 A * | 6/1999 | Fulk ...................... 709/310 |
| 5,937,170 A | 8/1999 | Bedarida |
| 5,968,136 A * | 10/1999 | Saulpaugh et al. ......... 709/312 |
| 5,991,822 A * | 11/1999 | Mealey et al. ............ 709/327 |
| 6,016,503 A | 1/2000 | Overby, Jr. et al. |
| 6,148,346 A * | 11/2000 | Hanson .................. 345/961 |

OTHER PUBLICATIONS

Panagiotis Kougiouris, "A Device Management Framework for an Object–Oriented Operating System", May 1991, Report of Department of Computer Science University of Illinois at Urbana–Champaign.

Glenn Krasner, "The Smalltalk–80 Virtual Machine", Aug. 1981, BYTE Publications Inc., p. 300–320 (even pages only).

Lemon et al., "An Object Oriented Device Driver Model", 1995, IEEE, p. 360–366.

Edward Tuggle, "Advanced Topics in Device Driver Design", Proceedings of the Annual Embedded Systems Conference, p. 437–454.

Greenspon, "Ring Array Processor, Programmer's Guide To The Rap Libraries," ICSI Technical Report, Sep. 1992.

Madany, "JavaOS™: A Standalone Java™ Environment," A White Paper, May 1996.

Sun Microsystems, Inc. and IBM, "JavaOS™ for Business™ Version 2.0 Reference Manual," Jun. 1998.

* cited by examiner

MECHANISM BY WHICH DEVICES ON UNFORESEEN PLATFORM VARIANTS MAY BE SUPPORTED WITHOUT RE-RELEASE OF CORE PLATFORM KERNEL SOFTWARE

BACKGROUND OF THE INVENTION

1. Field of the Invention

This invention relates to the field of operating systems and device drivers.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, Java, JavaOS, JavaStation, Hotjava Views and all Java-based trademarks and logos are trademarks or registered trademarks of Sun Microsystems, Inc. in the United States and other countries.

2. Background Art

Computers are controlled by software known as an "operating system". The operating system of a computer determines how the computer performs different functions that control the operation of the computer and controls how other programs run on the computer. There is a part of the operating system known as the "kernel" that can be thought of as the core of the operating system. The kernel contains basic functions controlling computer operation. A problem in the prior art is having an operating system that can operate with new types of computer equipment without needing to change the kernel software. This problem can be understood by the following review of computer systems, operating systems, and kernels.

Computer Operating System

A computer system consists of a central processing unit (CPU), memory (such as main memory, cache memory, etc.), and peripheral devices, also known as input/output devices (I/O). The processor can be thought of as the "brain" of the computer system. The processor is controlled by programs that consist of a series of instructions that cause the processor to perform certain functions. There is one program that controls all other programs that run on the processor. This program is known as the operating system of the computer.

The operating system can cause the processor to do certain functions or provide certain services. Other programs, referred to as "applications", use the operating system by making requests for services. Some of the services provided by the operating system include: determining which application should run at what time; managing the sharing of memory resources among applications; handling the I/O from attached hardware devices (e.g. disk drives, printers, modems, keyboards, scanners, etc.); sending error messages to the applications or computer user when appropriate; and overall management of the computer system. The core of the operating system is the system software kernel.

System Software Kernel

The kernel is the core of the computer operating system and provides basic services for all other parts of the operating system. A kernel generally includes a routine known as an "interrupt handler", a scheduler, and a supervisor. The interrupt handler handles requests for services or completed I/O operations that compete for the kernel's services. The scheduler determines which programs share the kernel's processing time. The supervisor gives use of the computer to each process when it is scheduled.

Problems in Prior Art Computer Systems

To describe some of the problems that are addressed by the present invention first requires the explanation of several concepts associated with computer systems. One is the notion of platforms and platform dependence and independence. Another is the notion of expansion buses and device drivers.

Platforms

A platform is the combination of the computer hardware (processor) and operating system that comprises a particular computer system. For example, a computer system with a processor manufactured by Intel and running the operating system known as Windows is considered to be a platform. An Intel computer running the DOS operating system is considered to be another platform. Other platforms include Sparc processor based computers from Sun Microsystems, Motorola processor based computers, and computers using the Unix operating system.

Platform Dependence and Independence

In the past, software was written specifically for a particular platform and would not run on other platforms. Such software is platform dependent. If a company wanted to sell a word processor application to users with different platforms, it was necessary to write a separate version of the word processing application for each platform on which it was intended to be used.

With the advent of object oriented programming and programming languages such as the Java programming language, it became possible to create applications that could be used on many platforms. Such an application, after being written once, could be used on any of a number of platforms. Such applications were said to be platform independent.

Expansion Buses

The present application relates in one embodiment to a part of a computer system known as an expansion bus. An expansion bus allows the processor of a computer system (via software running on the processor), main memory, and other hardware associated with a platform to control hardware devices external to the platform. These devices can include keyboards, printers, scanners, network interface and graphics cards, modems, and monitors. An expansion bus consists of conductors for data and control signals, along with hardware support logic chips and possibly firmware. There are a variety of expansion buses such as ISA (Industry Standard Architecture), PCI (Peripheral Component Interconnect), S-Bus, VME bus, etc. Each expansion bus defines a certain protocol by which devices that are on the bus are accessed.

A device driver is software used to control a peripheral device that is coupled with the computer system on the bus. In the past, device drivers were platform dependent. However, a scheme for implementing platform independent device drivers has been described in the following patents.

Ser. No. 09/107,047 entitled "Platform Independent Device Drivers" filed on Jun. 29, 1998 and assigned to the assignee of the present patent application; now U.S. Pat. No. 6,202,147.

Ser. No. 09/106,912 entitled "Security For Platform Independent Device Drivers" filed on Jun. 29, 1998 and assigned to the assignee of the present patent application; now U.S. Pat. No. 6,434,694.

Ser. No. 09/106,910 entitled "Endianness Checking For Platform Independent Device Drivers" filed on Jun. 29, 1998 and assigned to the assignee of the present patent application; now U.S. Pat. No. 6,202,147.

These patent applications are incorporated herein by reference. As described in the patent applications, there is a technique for communicating between device drivers and core platform system software. This scheme is implemented in an operating system referred to as the JavaOS. The cited patent applications describe a scheme that allows device drivers to be platform independent. A given JavaOS device driver is independent of the platform, and is only dependent on the bus. For example, a JavaOS device driver for a device on the PCI bus will run unchanged whether the PCI device it supports is connected to a Sparc processor-based platform or an x86 based platform. The same device driver runs unchanged on both platforms.

The scheme above is made possible through the use of software entities referred to as "bus managers". A bus manager is system kernel software that provides the interfaces that a device driver has for obtaining system resources (e.g. objects for accessing memory, including registers) and for otherwise doing any operation on the system. A bus manager does not control the bus. A bus manager is platform dependent with one bus manager for each platform supported for a particular bus. Because the bus managers are platform dependent, the JavaOS is not platform independent, but is platform dependent. However, many aspects of the JavaOS can be released by third parties. Those portions of the JavaOS that can be released by third parties, such as device drivers for example, are platform independent.

In the scheme described in the above referenced patent applications), a platform independent device driver specifies its request for the allocation of memory in terms of an abstract memory space of an associated bus manager. The device driver calls a bus manager interface to obtain the array of memory descriptors describing all memory objects that the device driver can allocate. The associated bus manager receives the request and then translates the request from the associated bus manager's abstract address space to a so called "platform manager" that uses real address space. The platform manager allocates real memory and the addresses are passed back to the device driver via the associated bus manager for that device driver. Because the device driver communicates with an associated bus manager to access abstract memory space, the device driver is platform independent.

The communication between the device driver and bus manager and platform manager is performed using a hierarchical abstract memory object class and related sub-classes provided by the Java programming language. These class and sub-classes are described in detail in co-pending U.S. pat. application Ser. No. 09/048,333 incorporated herein by reference. It will be appreciated, however, that the methods, systems, and software described herein can be enabled using any similar programming language using techniques known to those of skill in the computer science arts.

Figure 2:
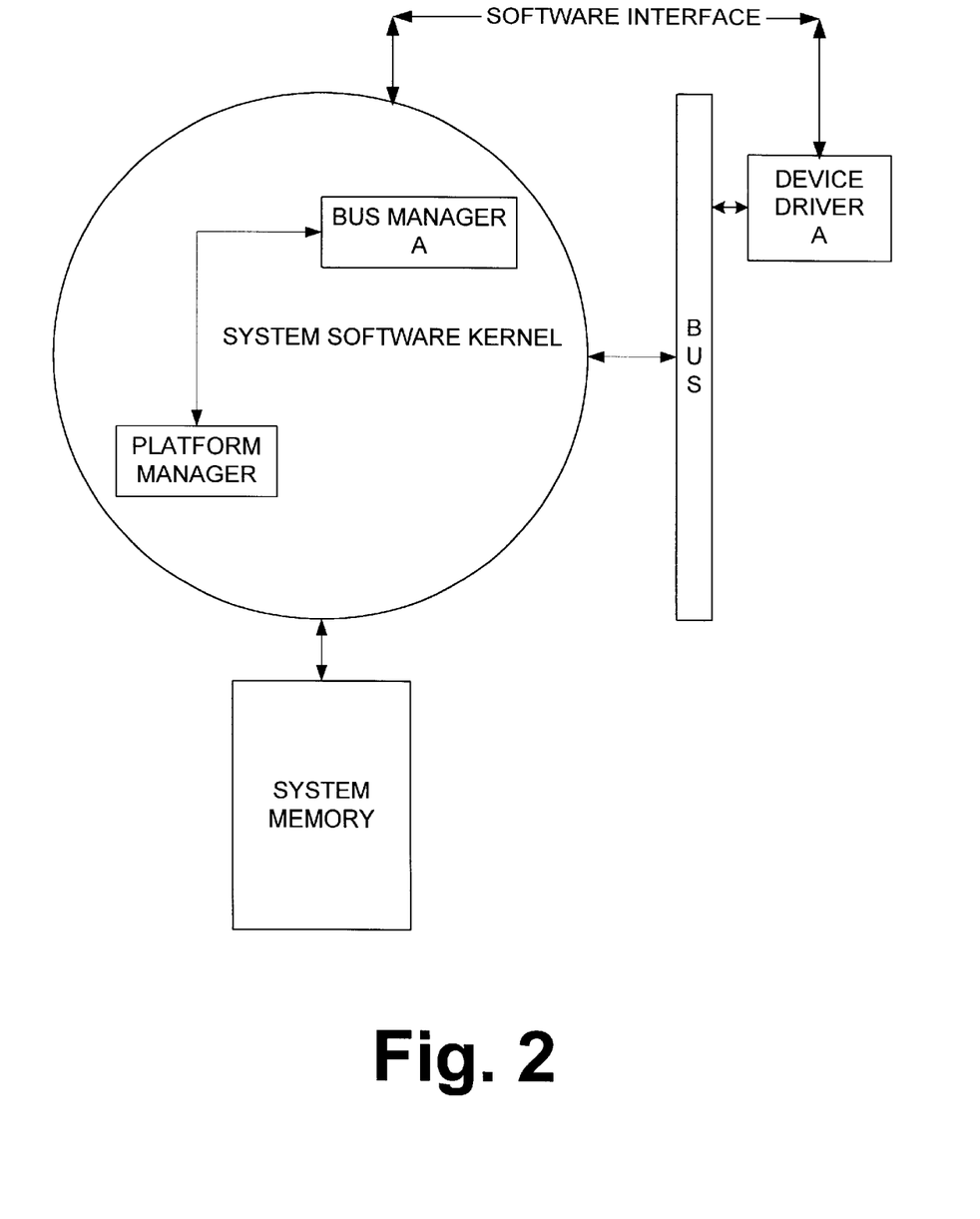
FIG. 2 illustrates an alternate driver/manager scheme.

The platform independent device driver scheme is illustrated symbolically in FIG. 2. A device driver A is associated with a device on an expansion bus. The device driver A (a software entity) communicates via a software interface with a bus manager A associated with that expansion bus. The device driver wants to have memory space allocated for its operation. Because the device driver is platform independent, it requests address space without regard to the platform on which it is running. It is in part the job of the bus manager to handle the request and allow memory to be allocated.

Bus managers are hierarchical in that they can communicate with higher-level bus managers to obtain system resources. The highest level bus manager is the platform manager, shown in FIG. 2. Bus manager A translates the driver request and forwards it to the platform manager. The platform manager allocates actual memory space appropriate for the platform and returns a memory descriptor object that is passed through the bus manager back to the device driver.

As an example of the operation of the platform independent device drivers described above, consider the case of a device driver written for a PCI bus. The driver requests memory specifying address 0x300 of the "config" address space of the PCI bus. The PCI bus manager knows that config starts at port 0x2000 and is mapped 1-to-1, so it translates 0x2000 of the config address space to 0x2300 of the "port I/O" address space. If the device is on a Sparc platform, the same 0x300 address would still be requested by the device driver (which is platform independent), but the bus manager would know to map the config address space to physical address 0x14000, and so the translation would be to 0x14300 of the physical memory address space.

What Happens When a Platform Variant is Released?

When the JavaOS is released, it may have included a finite set of bus managers intended to support devices for certain platforms. If a variant of a platform is released, a device on a particular bus on the variant platform may no longer be manageable by the bus manager associated with the device. As an example, there was a video device of the Cyrix MediaGx x86 platform. The device was first introduced on the PCI bus and was supported by a device driver that uses the PCI bus manager for the IBM x86 platform. Later, the same video device was put onto the motherboard. While it retains many characteristics of a PCI device, there are some new characteristics that are not part of the PCI protocol and therefore cannot be handled by existing bus managers, written for the platform, and released as core platform software.

When a platform is changed, or when a new platform is introduced, and if the existing bus manager for a device driver can no longer handle the driver, the only prior art solution is to rewrite the system software kernel to add an appropriate bus manager that can handle the driver on the platform variant. Bus managers are part of the core platform software, and are written and released (for the JavaOS), by companies such as Sun Microsystems, IBM, or by a JavaOS OEM. Because of the time and resources required to create, debug, and release core software kernel, it is not practical to support all new platforms and platform variations. The, time it would take to immediately support all platform variants as they are created would not satisfy "time to market" business constraints. The alternative to rewriting core system software is to fail to support the new platform until a scheduled OS upgrade. Neither of these solutions is desirable.

SUMMARY OF THE INVENTION

The present invention provides a means to support new and modified platforms without the need to modify the system software kernel. The invention uses an approach referred to as Platform Service Agents (PSAs). The PSA works with the bus manager of the system software for that platform variant and modifies the system resources as needed. The PSA isolates specifics of the platform, so that the bus manager need not be modified. Because the PSAs themselves are outside of the kernel, are downloadable, and easily created for platform variants, new platforms can be supported without modification or re-release of the system software kernel.

DETAILED DESCRIPTION OF THE INVENTION

The invention is a method and apparatus by which bus managers may support platform kernel software. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Example Embodiment

An embodiment of this invention is implemented in system software referred to as the Java operating system (JavaOS). The Java programming language is an object-oriented programming language with programs comprised of a number of different classes and interfaces. Unlike many programming languages, in which a program is compiled into machine-dependent, executable program code, programs written in the Java programming language are compiled into machine-independent bytecode classfiles. Each classfile contains code and data in a platform-independent format called the classfile format. The computer system acting as the execution vehicle contains a program called a virtual machine which is responsible for executing the bytecode. The virtual machine provides a level of abstraction between the machine-independent bytecode classes and the machine-dependent instruction set of the underlying computer hardware. Virtual machines exist for a variety of different operating systems.

If a new platform is introduced or a platform is modified, new bus managers may be required to support a device driver of the new platform. As noted previously, the creation of new bus managers is an unwanted modification of the system software kernel. The present invention overcomes that problem by implementing "Platform Service Agents" (PSAs). When dealing with a device driver for a new or modified platform is implemented (called here a "problematic driver"), a new PSA is released as necessary and made available for use. Like device drivers, the PSA is a separate binary (separate from the rest of the JavaOS) and outside of the system software kernel, so disadvantages associated with kernel modification do not apply.

Figure 3:
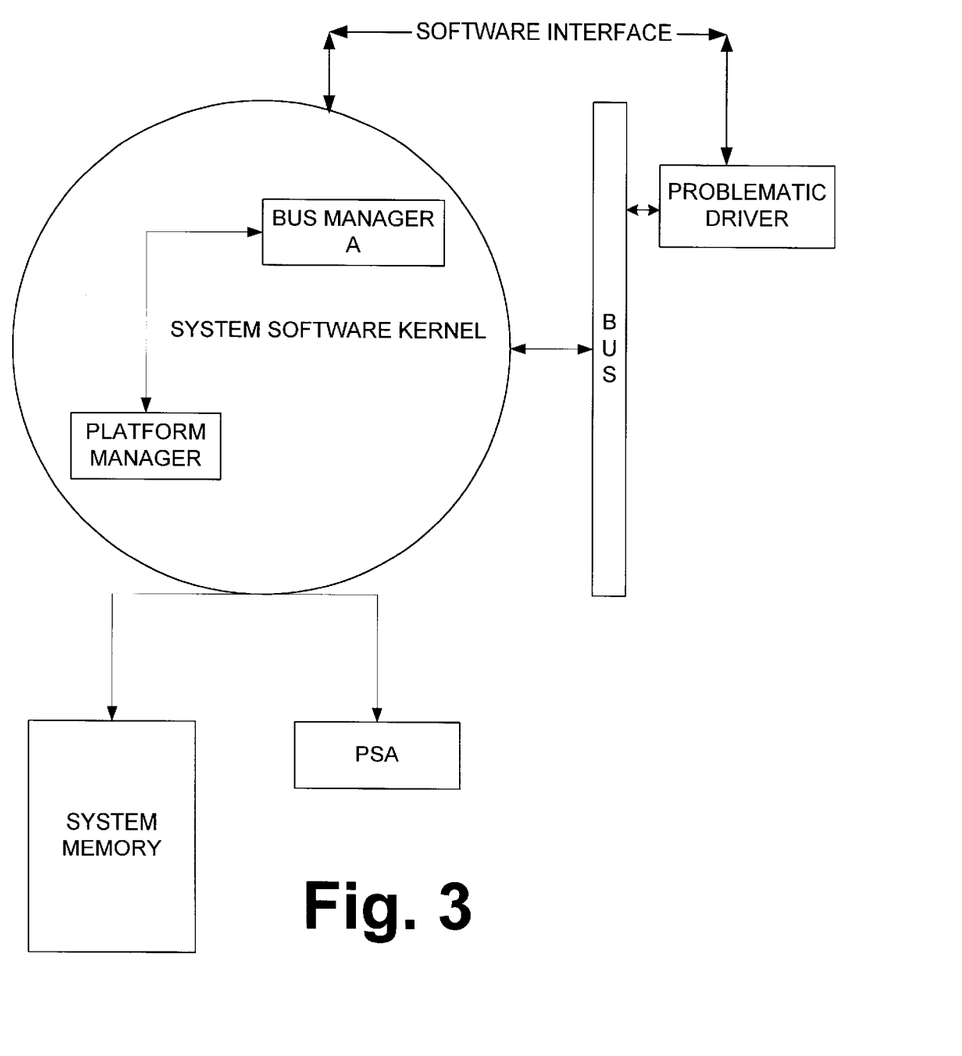
FIG. 3 illustrates an embodiment of the present invention.

FIG. 3 is a symbolic representation of the operation of an embodiment of the present invention. A request for service from a problematic driver is provided to a bus manager that would have handled the device driver on a previous platform. The bus manager checks to see if the driver has an associated PSA. When, as in this case, the problematic device has an associated PSA, the bus manager calls methods from the PSA to provide service for the problematic device. As shown in FIG. 3, the PSA is outside the system software kernel. Instead of writing a new bus manager, the present invention permits a PSA to be written for the driver so that the existing bus manager can perform as if it is a bus manager for the platform variant.

The present invention provides a scheme for modifying any resources allocated by a bus manager. In other words, for any bus management interface in the JDI between a device driver and its bus manager, it is possible to have a corresponding interface in the PSA that modifies what was done by the former interface.

One embodiment of the PSA is described below in connection with modifying memory descriptors. However, this is by way of example only. The present invention has application to any resources provided by a bus manager.

Operation of PSA System

A PSA works with a problematic driver's bus manager to modify the system resources for that particular problematic device. The PSA isolates specifics of the problematic platform, so that the bus manager can remain pure. The PSAs are themselves loadable (for example, via the Java System Loader (JSL)). Using this invention, a new x86-based PC platform can be supported without re-releasing the javaOS base.

A given PSA extends the PlatformServiceAgent class, which is a JDI class:

. . . /src/javaos/javaos/javaos/javax/system/jdi/ PlatformServiceAgent.java.

The Platform ServiceAgent class in turn extends the DeviceDriver class and implements PlatformService, which is a JDI interface:

. . . /src/javaos/javaos/javaos/javax/system/jdi/ PlatformService.java

The PlatformService interface specifies one method, createMemoryDescriptors( ), which a bus manager may call to obtain a modified array of memory descriptors for a particular problematic device, where the argument, device, is the entry in the device tree of the Java System Database (JSD), and the argument, b, is the particular instantiation of the device's bus manager:

public MemoryDescriptor[] createMemoryDescriptors (Entry device, ExpansionBus b);

Although the embodiment described above refers to a single method, other methods for other bus manager functionality could be implemented as well without departing from the scope of the present invention.

Figure 4:
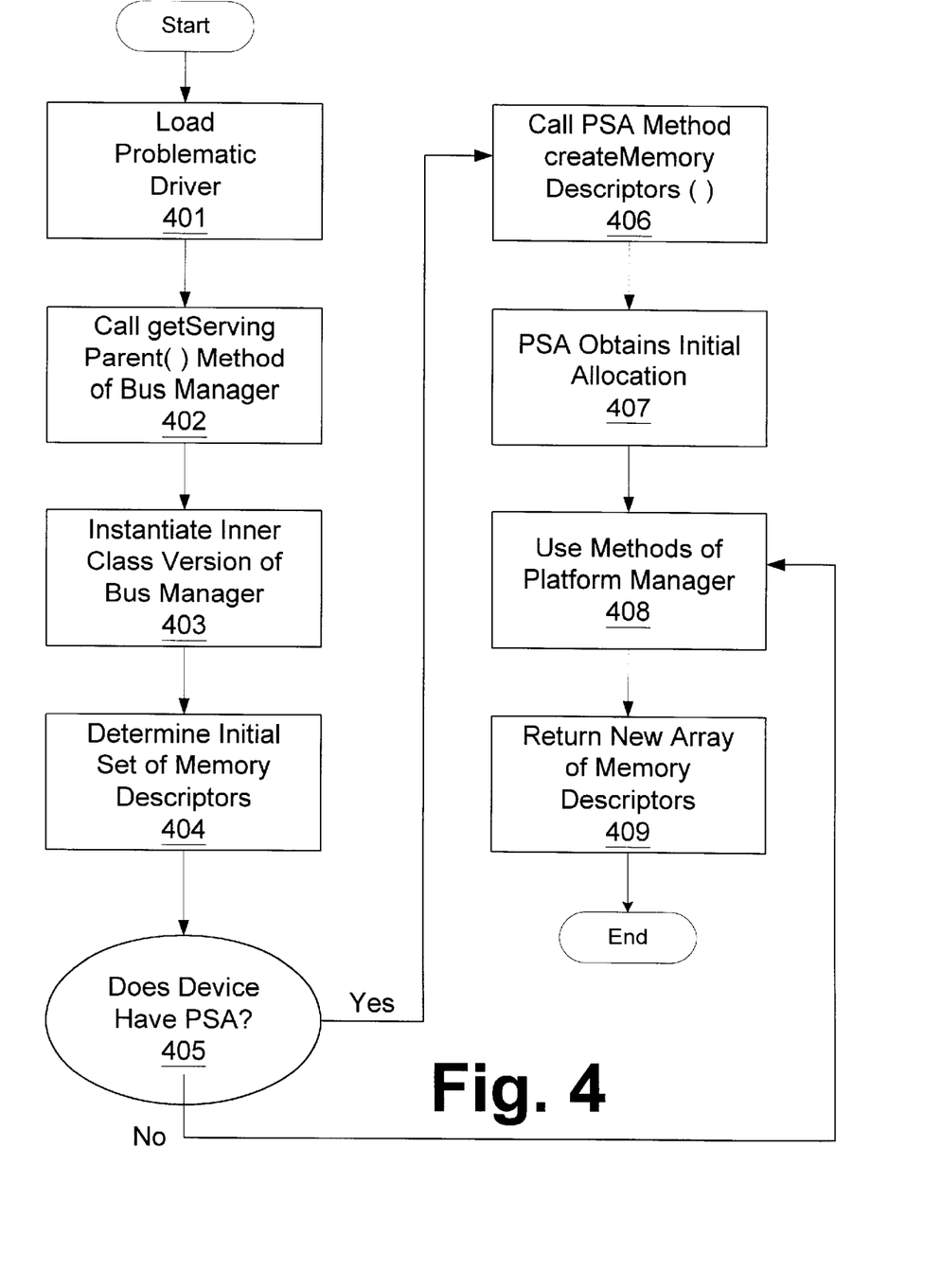
FIG. 4 illustrates a flow diagram illustrating operation of the present invention.

The operation of the invention is illustrated in connection with the flow diagram of FIG. 4. When loading a device driver at step 401, the JSL calls the getServing Parent( ) method of the driver's bus manager at step 402, passing the entry for this particular device in the JSD device tree. This allows the bus manager to instantiate, for security reasons, a particular Java inner-class instance of itself that knows about this specific device and contains resources specifically allocated for this device at step 403. (This provides security because the device driver does not need to identify itself to its bus manager, which already knows its identity, and consequently a rogue driver cannot claim to be supporting some arbitrary device.)

It is at this time, that the bus manager allocates resources, including MemoryDescriptors, for the device. First, the bus manager determines the initial set of Memory Descriptors for the device at step 404, doing so in the way it does normally for the devices it manages. Then, if the device driver has a PSA at decision block 405, (meaning it is a problematic driver), the bus manager calls the PSA's createMemoryDescriptors( ) method at step 406 to obtain a modified array of Memory Descriptors for the device.

The createMemoryDescriptors( ) method of the PSA provides the device's particular instantiation of its bus manager's inner class, so the PSA has at its disposal all the methods of the bus manager, allowing the PSA to obtain at step 407, for example, that device's initial allocation of Memory Descriptors, (already determined by the bus manager). Furthermore, the PSA, as a device of the PlatformManager, has at its disposal the methods of the PlatformManager, which is itself a bus manager. Using these methods at step 408 of both bus managers, along with its internal algorithms, the createMemoryDescriptors( ) method of the PSA returns to the device's bus manager the new array of MemoryDescriptors for the problematic device at step 409. When there is not a PSA for the loaded device, the system behaves as described in the incorporated patent applications with the bus manager using the PlatformManager methods at step 408 to return a new array of memory descriptors at step 409.

Even though the problematic device may not actually be a true device of its bus manager, its MemoryDescriptors are set by the PSA to appear to be valid descriptors for that particular bus manager. A PSA is not limited to a single bus manager, but could support multiple bus managers. The PSA could return, for example, ISA Bus Manager MemoryDescriptors when the bus manager passed to it is ISA, and PCI Bus Manager MemoryDescriptors when the bus manager passed to it is PCI.

PSA Virtual Device

As mentioned above, a PSA is a DeviceDriver that implements the PlatformService interface. Since a PSA is a device driver, it has an associated bus manager, namely the PlatformManager. (The PlatformManager is actually an abstract class which is extended by the abstract class, 1386Platform, which is further extended by PCPlatform. The PCPlatform then has an inner class, ICPCPlatform, which is instantiated for each particular PSA, and thus contains that particular PSA's system resources, such as MemoryDescriptors.). Since the bus managers, including the PlatformManager, extend the ExpansionBusManager abstract class, the PSA has all the JDI bus manager methods at its disposal, including the ones for obtaining its memory descriptors.

PSA devices are similar to ISA devices from the standpoint of how they are managed by their bus manager. For example, the ISA bus manager must build a device entry in the device tree corresponding to each device which specifies "ISA" as the value of its "busName" property to determine which ISA devices are present. Also, the ISA bus manager cannot determine device parameters, such as registers, by probing hardware, and so it determines these parameters from properties specified by the devices.

Similarly, the PSAs are virtual devices which cannot be probed in hardware, and are therefore specified by properties. One manner of specifying properties are so called "business cards". Since PSAs are similar to ISA devices, the same syntax is used in their business cards for specifying device parameters. PSA business cards are distinguished from ISA business cards by the value of the busName, which is "platform" for PSAs.

For code sharing, the code previously in the ISA bus manager for "probing" the ISA devices from their business cards to build the device tree, along with the code for determining device parameters from the ISA business cards, was moved from the ISA bus manager to the ExpansionBusManager class, so that both the ISA bus manager and the platform manager could use it.

Security Considerations

It is possible that both the problematic device driver and the PSA are developed by the same organization. However, security considerations necessitate that the device driver and PSA be deployed differently. The PSA is a loadable bus manager and can allocate system resources for a device. Therefore, it should be configured to load from a known trusted file (such as a Java applet resource (JAR) file) on a local server. The PSA could provide methods that the device driver could invoke directly, so it may be advisable to have source code for the PSA (or get its jar from a trusted source) before allowing it on the server. The device driver, though, being less trusted, could possibly be loaded from a location on the internet.

Loading and Invoking PSAs

Figure 5:
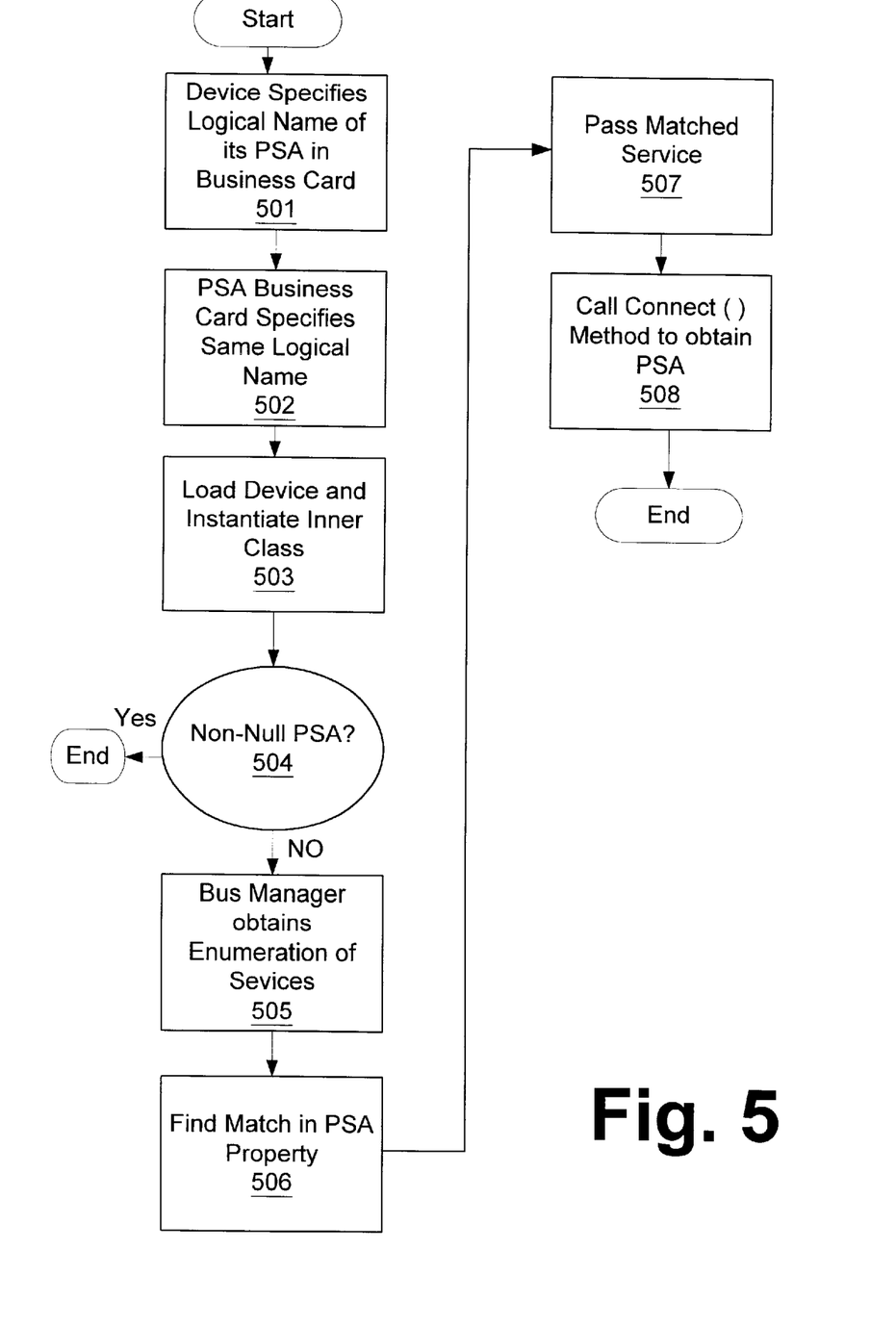
FIG. 5 illustrates a flow diagram illustrating operation of the present invention.

Loading and invoking PSAs is illustrated in the flow diagram of FIG. 5. The example of FIG. 5 relates to a PSA written for a device on the ISA bus manager, but the present invention has equal application to any other bus manager. Referring to FIG. 5, an ISA device specifies at step 501 the logical name of its PSA via new property, "PSA", in its business card (as a naming convention, the PSA's logical-name is "<device_name>PSA" where <device_name> is either the name of the device or the logical name of the device). The business card for the corresponding PSA specifies the same logical name in the logical name part of the bundleInstanceInfo property at step 502, and it specifies javaos.javax.system.jdi.PlatformService for the interface name part of the bundleInstanceInfo property.

When the JSL is loading an ISA device, the ISA bus manager's getServingParent( ) method is called to instantiate an inner class of the bus manager for that particular device at step 503, and it is at this time that the bus manager invokes the device driver's PSA (calls createMemoryDescriptors( )). The ISA bus manager does this only if device's business card specifies a non-null PSA at decision block 504. When the device's business card does specify a non-null "PSA", the ISA bus manager uses the Service-Loader.findAdvertisements( ) method to obtain an enumeration of ServiceAdvertisements for services that implement that javaos.javax.system.jdi.PlatformService interface at step 505. Then, for each ServiceAdvertisement in that enumeration, the ISA bus manager calls the getLogicalName( ) method of the ServiceAdvertisement, and compares the name to the name specified in the PSA property to find a match at step 506. When a match is found, the ServiceConnection for the PSA is obtained by passing the matched ServiceAdvertisement to the Service-Loader.findService( ) method at step 507, and the connect( ) method (connect (null, true)) of the ServiceConnection is called, before calling the getService( ) method of the ServiceConnection to obtain the PSA at step 508, which is a service.

Communication Between Drivers and Their PSAs

To allocate system resources, such as memory objects, device drivers interface with their bus manager, as usual, and the driver's bus manager interfaces with the driver's PSA. The driver does not interface directly with its PSA to allocate system resources.

One workable facility for communication between PSAs and their device driver involves the PSA storing properties in the device's entry in the JSD, and the device driver then getting these property values. Since drivers do not have their device entry, a new method is added to ExpansionBusManager, getDeviceEntry, which returns it. This method is defaulted to returning null in ExpansionBusManager, since only the inner class bus manager actually knows the device entry. This inner class then overrides getDeviceEntry( ) with a method that returns the device entry corresponding to the device it serves.

Using this method provides a facility whereby the PSA can provide additional information to its corresponding driver, without requiring the API between the driver and bus manager to be extended for each such piece of information the driver may need from the PSA. It is also possible for the driver to find its PSA and invoke a method of the PSA directly. (It should be noted that this facility does not allow the driver to subvert the security of the API between device driver and inner-class bus manager. For example, even though the driver could call the create-MemoryDescriptors ( ) method of the PSA directly, there is no bus manager API that allows a driver to pass a MemoryDescriptor to a bus manager to allocate a memory object.)

Embodiment of Computer Execution Environment (Hardware)

Figure 1:
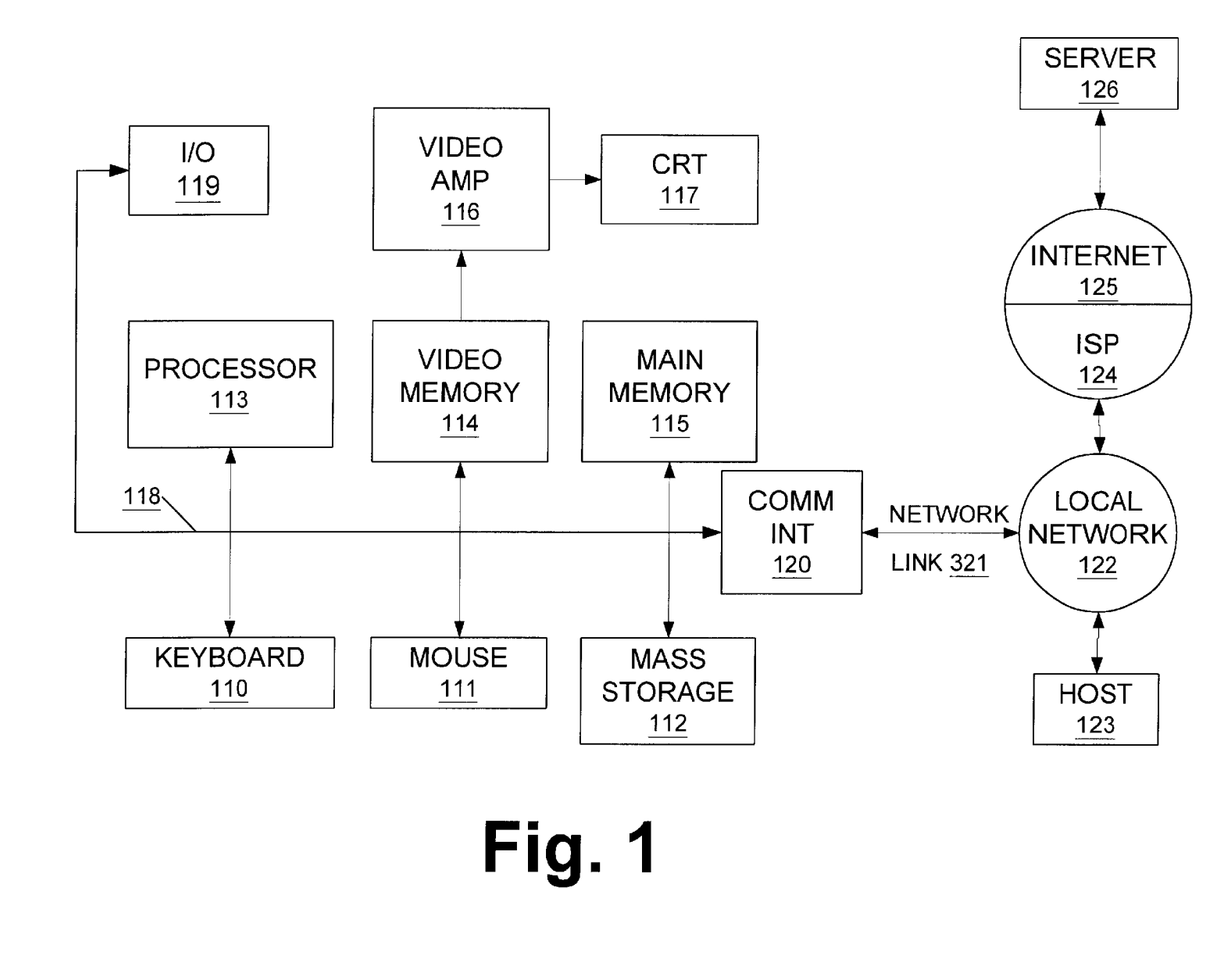
FIG. 1 illustrates an example computer system for implementing the invention.

An embodiment of the invention can be implemented as computer software in the form of computer readable code executed on a general purpose computer such as computer 100 illustrated in FIG. 1, or in the form of bytecode class files running on such a computer. A keyboard 110 and mouse 111 are coupled to a bi-directional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for providing a mechanism by which bus managers may support platform kernel software is described in conjunction with one or more specific embodiments. The invention is defined by the claims and their full scope of equivalents.

What is claimed is:

1. A computer implemented method for implementing an interface to a device driver comprising:

generating a request from said device driver associated with a first platform;

providing said request to a bus manager interface, said bus manager interface written for a second platform and where said bus manager interface cannot handle said request; and modifying said bus manager interface using a platform service agent (PSA) so that said bus manager interface can handle said request.

2. The method of claim 1 wherein said first platform is a variant of said second platform.

3. The method of claim 1 wherein said bus manager is part of a system software kernel.

4. The method of claim 3 wherein said PSA is not part of said system software kernel.

5. The method of claim 1 wherein said device driver, said bus manager, and said PSA are implemented in the Java programming language.

6. The method of claim 1 wherein said request is a request for an array of memory descriptors and said PSA modifies said array of memory descriptors, said device driver then calling a method to allocate memory associated with one of said modified array of memory descriptors.

7. An apparatus for implementing an interface to a device driver comprising:

a device driver associated with a first platform;

a bus manager interface called by said device driver, said bus manager interface written for a second platform and where said bus manager interface cannot handle a request generated by said device driver; and a platform service agent (PSA) for modifying said bus manager interface so that said bus manager interface can handle said request.

8. The apparatus of claim 7 wherein said first platform is a variant of said second platform.

9. The apparatus of claim 7 wherein said bus manager is part of a system software kernel.

10. The apparatus of claim 9 wherein said PSA is not part of said system software kernel.

11. The apparatus of claim 7 wherein said device driver, said bus manager, and said PSA are implemented in the Java programming language.

12. The apparatus of claim 7 wherein said request is a request for an array of memory descriptors and said PSA modifies said array of memory descriptors, said device driver then calling a method to allocate memory associated with one of said modified array of memory descriptors.

13. A computer readable medium including computer program code for implementing an interface to a device driver, said computer readable medium comprising:

computer program code for generating a request from said device driver associated with a first platform;

computer program code for providing said request to a bus manager interface, said bus manager interface written for a second platform and where said bus manager interface cannot handle said request; and computer program code for modifying said bus manager interface using a platform service agent (PSA) so that said bus manager interface can handle said request.

14. A computer readable medium as recited in claim 13, wherein said first platform is a variant of said second platform.

15. A computer readable medium as recited in claim 14, wherein said bus manager is part of a system software kernel.

16. A computer readable medium as recited in claim 15, wherein said PSA is not part of said system software kernel.

17. A computer readable medium as recited in claim 16, wherein said device driver, said bus manager, and said PSA are implemented in the Java programming language.

18. A computer readable medium as recited in claim 17, wherein said request is a request for an array of memory descriptors and said PSA modifies said array of memory descriptors, said device driver then calling a method to allocate memory associated with one of said modified array of memory descriptors.

19. A computer implemented method as recited in claim 1, wherein said computer implemented method further comprises:

loading said device driver; and determining an initial set of memory descriptors.

20. A computer implemented method as recited in claim 1, wherein said computer implemented method further comprises:

determining whether there is a PSA associated with said device driver.

* * * * *